Oct. 22, 1935. G. L. BRIGGS 2,017,891
SKID PREVENTER
Filed Aug. 11, 1933 2 Sheets-Sheet 1
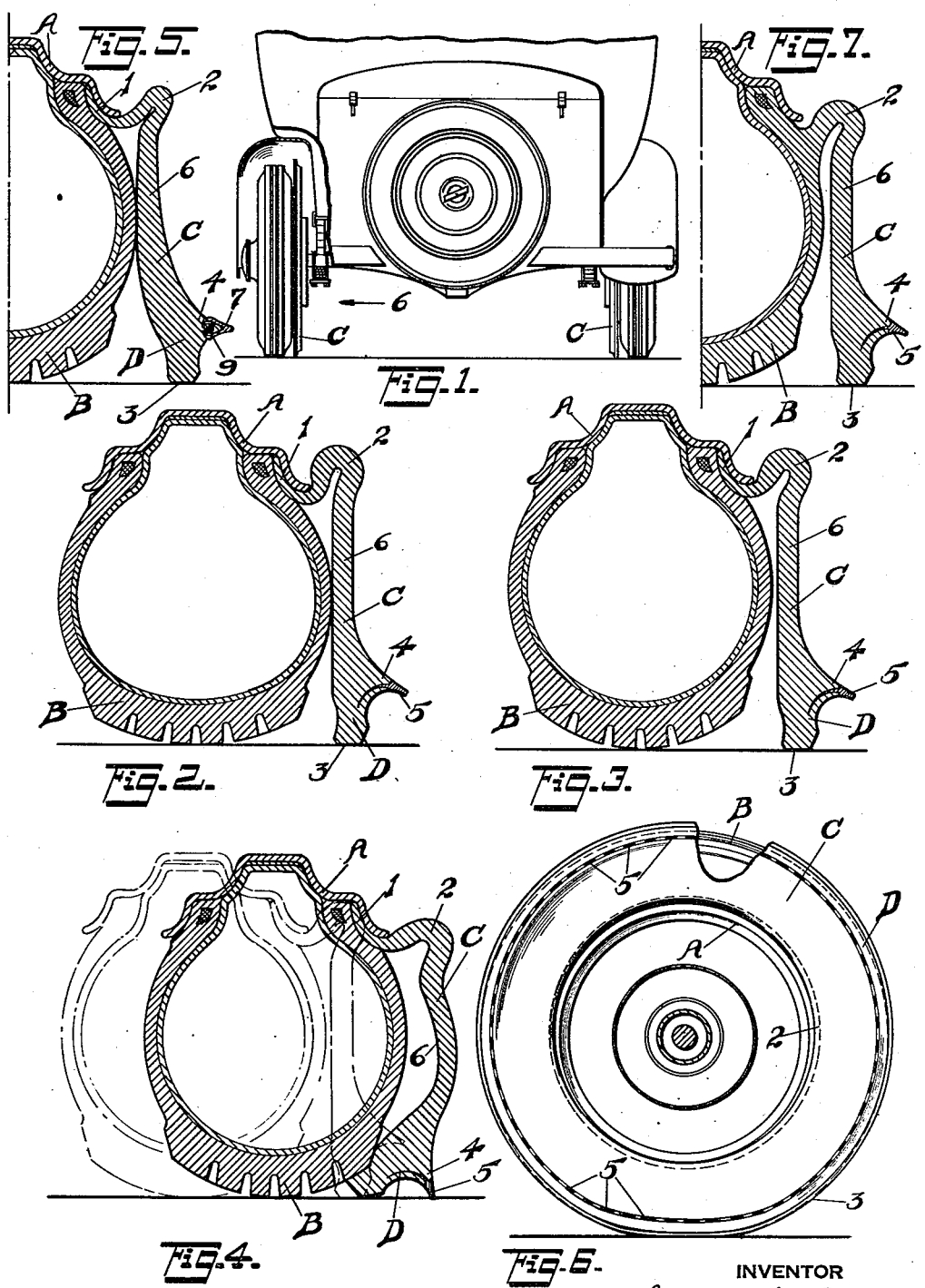
INVENTOR
George L. Briggs Oct. 22, 1935.   G. L. BRIGGS   2,017,891
SKID PREVENTER
Filed Aug. 11, 1933   2 Sheets-Sheet 2
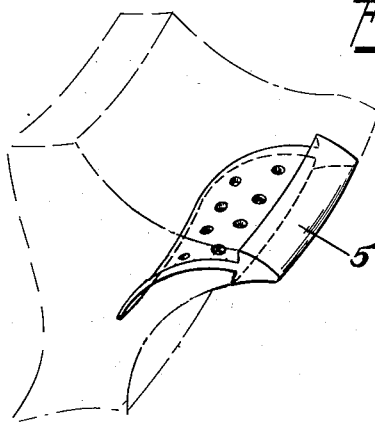
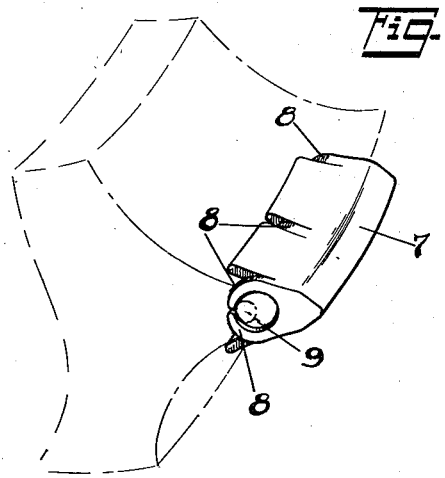

Patented Oct. 22, 1935

2,017,891

UNITED STATES PATENT OFFICE 2,017,891

SKID PREVENTER

George L. Briggs, Oneida, N. Y.

Application August 11, 1933, Serial No. 684,624

5 Claims. (Cl. 152—14)

This invention relates to improvements in skid-preventers for automotive vehicles.

The object of the invention is to provide a skid-preventer which can be used with tires of fabric and rubber such as the usual cushion and pneumatic tires without danger of injury to the tire, which will be durable and noiseless, which can be manufactured economically and which when in place on a vehicle will not detract from its appearance.

It has been common in the art heretofore to provide non-skidding devices comprising a metallic ring of curved cross-section, convex exteriorly, this ring being mounted on radial leaf springs secured to the wheel, in such a way that one edge of the curved ring will run on the roadway close to the tire, the theory of operation being that as the vehicle skids, the tire will move laterally and slide up onto the edge of the metallic rim, which thereby adds its frictional resistance to that of the tire, the outer surface of the ring being roughened to increase such resistance. In such a construction, the metallic ring of curved cross-section is of necessity very rigid and tends to retain its circular shape at all times, notwithstanding the somewhat flexible radial supporting arms, so that such a ring touches the road along a mere line and hence can add but little surface of resistance to skidding. Owing to the relative rigidity of the said ring itself and the compressibility of the ordinary cushion or pneumatic tire under load, the metallic ring is soon ground smooth by attrition against the usual concrete roads. Such a surface not only would not increase the resistance of the wheel to skidding but on account of its hardness and smoothness and its mere line contact with the road would act as an ideal sled runner on to which the tire would mount and promptly skid with the ring easier than it would without it. In other words a metallic ring of curved cross-section cannot conform itself to the roadway as does a pneumatic tire and hence not only cannot appreciably increase the resistance to skidding, but can actually reduce it if the tire itself runs up onto the metallic ring and thereby to that extent reduces its own contact with the road. Any theory that the curved cross-section of the metallic ring will flatten itself out in case of skidding and thereby bring another surface of the ring into contact with the road is an error arising perhaps from studying a cross-section only of the ring, and failing to consider the entire ring, because the elastic limit of even the best metal will not provide sufficient stretch in the annular upward curved portion to allow any appreciable flattening of the cross-sectional curve except by destruction of the ring. The result is that the surface of the ring which normally runs in contact with the road is practically the only surface which comes into action to furnish frictional resistance when skidding takes place.

It has also been known to furnish a ring of readily deformable material, for example, rubber and canvas, having a tread portion always running in good contact with the road, the said ring having a general wedge shape cross-section so that at the time of skidding the tire will ride up on the wedge, thus locking the tire and ring into a unitary whole, so that the bearing surface of the ring on the road is added to that of the tire itself to increase the resistance to skidding. In this type of non-skidding device, as well as in that hereinbefore mentioned, the surface which is relied on to prevent skidding is the same surface which runs in contact with the road in normal operation. As this surface is gradually abraded away to a smooth condition it is not reliable when skidding occurs.

It is the object of the present invention to overcome the defects of the prior art and provide a skid-preventing device which is relatively noiseless and reliable.

With this general object in view and some others which will be obvious from the description hereinafter, the invention consists in providing a ring of somewhat larger exterior diameter than the greatest diameter of the unloaded tire periphery and of readily deformable resilient material such as rubber and canvas, as distinguished from metal, which will have a peripheral surface to run in contact with and be compressed by the road during normal operation and will have another continuous ring surface, which may be called the principal skid-resisting or emergency surface, which is normally carried well up from the road and which will only be thrown down in contact with the road at the time a skid starts. Such an emergency skid-resisting surface, being free from the normal wear due to abrasion against the road, is always in good condition, so that when swung down into contact with the road by the commencement of a skid, it will offer the maximum frictional resistance to skid action. Such a surface may carry armor or sharpened projections of a suitable nature to bite into the road, thereby making skidding a practical impossibility.

The invention will be described more particularly in connection with the accompanying drawings and then pointed out in the claims.

In the drawings:—

Fig. 1 is a rear elevation of an automobile with one skid-preventer embodying the present invention in place on each rear wheel.

Fig. 2 a cross-section through a rim, pneumatic tire and a skid-preventer of the present invention at the lower side of a wheel, to illustrate the tire loaded and somewhat compressed or deformed as in normal running of the vehicle.

Fig. 3 is a similar view to illustrate the position of the parts at the beginning of a skid to the right, in which case the load on the wheel is reduced and the tire is not deformed in cross-section.

Fig. 4 is a cross-sectional view showing the tire locked by the skid-preventer, the original position of the parts at the beginning of the skid being shown by dotted lines.

Fig. 5 is a cross-sectional view illustrating a modified form of skid-preventer with the tire loaded.

Fig. 6 a side elevation of an automobile disk-wheel with the skid preventer on it, and Fig. 7 a further modification of the invention showing the skid-preventer made integral with the tire.

Figs. 8 and 9 are enlarged perspective views of the two types of spurs or armor devices referred to hereinafter.

Referring to the drawings, A indicates the ordinary metallic rim of a usual automobile wheel, B the usual pneumatic tire, and C the skid-preventer of the present invention made of readily deformable resilient material such as is used for tires.

Referring to Figs. 1 to 6, it will be seen that the skid-preventer consists of an annular structure having an inturned margin portion 1 which is of such thickness that it can be inserted between the tire and the rim when the tire is put on the rim. When the tire is inflated the inner marginal portion 1 of the skid-preventer is firmly clamped in place, the tire being slightly deformed adjacent the said marginal portion, to make room for it. The skid-preventer has a fold or roll portion which may be located at any suitable portion of the skid-preventer, but in the best embodiment of the invention is near the rim as indicated at 2. At the extreme outer margin of the annular skid-preventer it is formed with what may be termed a bell-crank section D, on account of the bell-crank action which it has in skid-preventing which will be more fully explained hereinafter. The bell-crank section has a peripheral face 3, which normally runs over the road and is compressed like the periphery of the tire, this face serving to swing the bell-crank D when the car starts to move side-wise in skidding to the right, Fig. 1. The bell-crank portion also has a continuous lateral emergency surface normally out of contact with the road, a part of this being brought into contact with the road in case the vehicle attempts to skid. The emergency surface is indicated at 4 and may be armored at its extreme edge as indicated at 5. The armor need not be a continuous metal ring, but most advantageously consists of a plurality of separate cleats or spurs each having a perforated tang suitably anchored in the fabric of the bell-crank portion. One of these spurs 5, is shown in cross-section in Figs. 2, 3, 4, and 7, and in perspective in Fig. 8. The spurs are spaced apart around the skid-preventer as indicated in Fig. 6.

The roll-portion 2 of the skid-preventer is connected with the bell-crank portion by an annular intermediate web which will be termed the link portion 6 because it acts to transmit a thrust from the compressed peripheral face to the roll-portion in normal operation and to transmit a pull from the bell-crank portion to the roll-portion and thereby unroll or pull down material from the roll to allow the emergency surface of the bell-crank portion to make a close contact with the road.

As the skid-preventer is made of resilient, readily deformable material, such, for example, as rubber and canvas, it can have the various parts modified in stiffness or flexibility as may be required. For example, the inner margin portion 1 and the upper part of the roll portion must act resiliently to resist the thrust from that part of the periphery in contact with the road, and thereby tend to hold the bell-crank portion downward in contact with the road when it reaches the lower portion of its orbit. The bell-crank porton must be stiff enough to act as a bell-crank so that when the vehicle tends to skid to the right in Fig. 3, the pressure of the peripheral surface flattened against the road will offer sufficient resistance to side movement, so that the vehicle will move toward it and finally allow the edge of the tire to engage the upper side of the bell-crank, thereby forcing the same downward, and tilting the emergency surface into contact with the road, the downward pull of the bell-crank portion uncoiling the roll portion in order to draw out sufficient material from the roll to allow for the increased distance radially of the emergency surface from the wheel axis or axis of rotation. In this way skidding is prevented at start, and so soon as the tires of the vehicle proceed without lateral shift the tire frees the bell-crank portion and the latter is returned to its normal running position by the resiliency of the roll and the upward thrust on the peripheral surface.

In Fig. 5 is shown a somewhat modified form of skid-preventer having a flatter roll-portion, in which the link portion may be somewhat bowed inward toward the tire to rest against the same durng normal operation. In this modification, there is shown another type of spur. As shown in Fig. 9 it consists of a metallic clip-like head 7 with several hooked prongs 8 which may be inserted into the tire and forced shut onto a metallic holding member 9 embedded in the tire at the time of manufacturing it. With this form of spur, a worn spur may be removed and replaced with a new one, in an obvious manner.

In Fig. 7 the skid-preventer is arranged to be secured to the vehicle wheel through the tire by making the tire and skid-preventer integral.

It is obvious that such a skid-preventer will be as noiseless as a tire, there being no metallic parts to pound the road, except when skidding occurs and the metallic cleats or spurs dig into the road to stop the skidding. It is to be noted that when an automotive vehicle tends to skid, the wheel which is on that side of the vehicle toward which the skid takes place usually has its tire somewhat more compressed than during normal running, whereas the other or trailing wheel has its pressure against the road reduced, sometimes to the extent that the tire on the said trailing wheel is not deformed or flattened against the road but has its full diameter of periphery, considered vertically. By making the skid-preventer of a greater diameter than that of the periphery of the tire in its undeformed condition, the lower side of the peripheral running surface of the skid-preventer is deformed or flattened against the road to give a good contact area, thereby insuring that the said peripheral surface will adhere to the road and cause the swinging of the bell-crank portion to bring its emergency surface in contact with the road in case of a material sidewise movement of the vehicle. Thus, so long as the vehicle does not turn over, the usual lightening of the load on the tire of that wheel which would be trailing the other wheel in the sideways movement, cannot result in freeing the skid-preventer from contact with the road, for the reason that the skid-preventer has its out-to-out diameter enough greater than that of the tire to insure a good contact with the road at that time. Since the skid-preventers are on the inner sides of the wheels only, but one skid-preventer acts to prevent skidding, namely, the one connected to the trailing wheel. This avoids any danger of overturning the vehicle, as might exist if a skid-preventer was attached to the outside of the leading wheel and tending to lock the same against sidewise movement.

What I claim is:

1. An annular skid-preventer arranged to be secured to a vehicle wheel alongside of the tire, said skid-preventer being of readily deformable resilient material and having its outer margin thickened to form a continuous bell-crank portion, one continuous arm of which normally extends toward the road and has a peripheral running surface for engagement with the road, the other continuous arm of the bell-crank portion extending laterally and having an emergency skid-preventing surface normally at a distance from the road, said skid-preventer also having a preformed, laterally-extending, continuous roll portion arranged to resist thrust, and a link-portion connected to the bell-crank portion intermediate the peripheral running surface and the emergency surface of the bell-crank portion and also connected to the roll portion to pull down and unroll the latter when skidding occurs, to allow the peripheral running surface to turn to an erect position out of contact with the road and the emergency skid-preventing surface to turn down into contact with the road, said link-portion being arranged to transmit upward thrust from the peripheral running surface to the roll portion during normal running of the vehicle.

2. An annular skid-preventer arranged to be secured to a vehicle wheel alongside of the tire, said skid-preventer being of readily deformable resilient material and having its outer margin thickened to form a continuous bell-crank portion, one continuous arm of which normally extends toward the road and has a peripheral running surface for engagement with the road, the other continuous arm of the bell-crank portion extending laterally and having an armored emergency skid-preventing surface normally at a distance from the road, said skid-preventer also having a preformed, laterally-extending continuous roll portion arranged to resist thrust, and a link-portion connected to the bell-crank portion intermediate the peripheral running surface and the emergency surface of the bell-crank portion and also connected to the roll portion to pull down and unroll the latter when skidding occurs, to allow the peripheral running surface to turn to an erect position out of contact with the road and the emergency skid-preventing surface to turn down into contact with the road, said link-portion being arranged to transmit upward thrust from the peripheral running surface to the roll portion during normal running of the vehicle, the armor on the emergency surface consisting of a plurality of separated metallic spurs having heads to engage the road when skidding starts, and also having shanks secured in the skid-preventer.

3. An annular skid-preventer arranged to be secured to a vehicle wheel alongside of the tire, said skid-preventer being of readily deformable resilient material and having its outer margin thickened to form a continuous bell-crank portion, one continuous arm of which normally extends toward the road and has a peripheral running surface for engagement with the road, the other continuous arm of the bell-crank portion extending laterally and having an emergency skid-preventing surface normally at a distance from the road, said skid-preventer also having a preformed, laterally-extending, continuous roll portion arranged to resist thrust, and a link-portion connected to the bell-crank portion intermediate the peripheral running surface and the emergency surface of the bell-crank portion and also connected to the roll portion to pull down and unroll the latter when skidding occurs, to allow the peripheral running surface to turn to an erect position out of contact with the road and the emergency skid-preventing surface to turn down into contact with the road, said link-portion being arranged to transmit upward thrust from the peripheral running surface to the roll portion during normal running of the vehicle, said annular skid-preventer having a maximum diameter greater than that of the tire with which it is to be used, whereby it is deformed against the road when the tire is not subjected to load.

4. An annular skid-preventer arranged to be secured to a vehicle wheel alongside of the tire, said skid-preventer being of readily deformable resilient material and having its outer margin thickened to form a continuous bell-crank portion, one continuous arm of which normally extends toward the road and has a peripheral running surface for engagement with the road, the other continuous arm of the bell-crank portion extending laterally and having an emergency skid-preventing surface normally at a distance from the road, said skid-preventer also having a preformed, laterally-extending continuous roll portion arranged to resist thrust, and a link-portion connected to the bell-crank portion intermediate the peripheral running surface and the emergency surface of the bell-crank portion and also connected to the roll portion to pull down and unroll the latter when skidding occurs, to allow the peripheral running surface to turn to an erect position out of contact with the road and the emergency skid-preventing surface to turn down into contact with the road, said link-portion being arranged to transmit upward thrust from the peripheral running surface to the roll portion during normal running of the vehicle, said skid-preventer having an inner margin arranged to be clamped between the tire and rim of the vehicle wheel.

5. An annular skid-preventer arranged to be secured to a vehicle wheel alongside of the tire, said skid-preventer being of readily deformable resilient material and having its outer margin thickened to form a continuous bell-crank portion, one continuous arm of which normally extends toward the road and has a peripheral running surface for engagement with the road, the other continuous arm of the bell-crank portion extending laterally and having an emergency skid-preventing surface normally at a distance from the road, said skid-preventer also having a preformed, laterally-extending continuous roll portion arranged to resist thrust and a link-portion connected to the bell-crank portion intermediate the peripheral running surface and the emergency surface of the bell-crank portion and also connected to the roll portion to pull down and unroll the latter when skidding occurs, to allow the peripheral running surface to turn to an erect position out of contact with the road and the emergency skid-preventing surface to turn down into contact with the road, said link-portion being arranged to transmit upward thrust from the peripheral running surface to the roll portion during normal running of the vehicle, said skid-preventer being made integral with the tire.

GEORGE L. BRIGGS.